United States Patent
Featherston et al.

(10) Patent No.: US 11,340,084 B1
(45) Date of Patent: May 24, 2022

(54) ROUTING WITH BENEFIT ACCUMULATION

(71) Applicants: Ashley D. Featherston, Santa Clara, CA (US); Kurt L. Adelberger, San Carlos, CA (US); Cem Koc, Berkeley, CA (US); Srichand Pendyala, Cupertino, CA (US)

(72) Inventors: Ashley D. Featherston, Santa Clara, CA (US); Kurt L. Adelberger, San Carlos, CA (US); Cem Koc, Berkeley, CA (US); Srichand Pendyala, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 16/550,618

(22) Filed: Aug. 26, 2019

Related U.S. Application Data

(60) Provisional application No. 62/727,600, filed on Sep. 6, 2018.

(51) Int. Cl.
    *G01C 21/34*      (2006.01)
    *G06Q 30/02*      (2012.01)

(52) U.S. Cl.
    CPC ..... *G01C 21/3453* (2013.01); *G06Q 30/0283* (2013.01)

(58) Field of Classification Search
    CPC .................. G01C 21/3453; G06Q 30/0283
    See application file for complete search history.

(56) References Cited

U.S. PATENT DOCUMENTS

| | | |
|---|---|---|
| 5,272,638 A | 12/1993 | Martin et al. |
| 6,259,988 B1 | 7/2001 | Galkowski et al. |
| 7,778,773 B2 | 8/2010 | Yaqub et al. |
| 7,835,859 B2 | 11/2010 | Bill |
| 8,065,073 B2 | 11/2011 | Downs et al. |
| 8,121,749 B1 * | 2/2012 | Agrawal ............ G01C 21/3407 701/25 |
| 8,615,354 B2 | 12/2013 | Barker et al. |
| 8,706,409 B2 | 4/2014 | Mason et al. |
| 8,886,453 B2 | 11/2014 | Cerecke et al. |
| 9,076,332 B2 | 7/2015 | Myr |

(Continued)

OTHER PUBLICATIONS

Wikipedia, "Bellman-Ford Algorithm", Downloaded Sep. 6, 2018, https://en.wikipedia.org/wiki/Bellman%E2% 80%93Ford_algorithm (5 pp).

*Primary Examiner* — Khoi H Tran
*Assistant Examiner* — Tristan J Greiner
(74) *Attorney, Agent, or Firm* — Young Basile Hanlon & MacFarlane, P.C.

(57) ABSTRACT

A method includes performing multiple steps of a route planning procedure based on starting and ending locations. Each of multiple steps of the route planning procedure includes maintaining information that identifies candidate routes by which graph elements can be reached or occupied during a current step, updating an accumulated cost for each of the candidate routes, updating an accumulated benefit for each of the candidate routes, determining a minimum return cost to the ending location for each candidate route, and eliminating candidate routes that cannot reach the ending location within a cost budget. A highest-benefit route from the candidate routes is selected.

23 Claims, 6 Drawing Sheets

(56) References Cited

U.S. PATENT DOCUMENTS

| | | | | |
|---|---|---|---|---|
| 2002/0174003 A1* | 11/2002 | Redmann | ............... | G06Q 10/04 |
| | | | | 705/6 |
| 2007/0156326 A1* | 7/2007 | Nesbitt | .............. | G01C 21/3453 |
| | | | | 701/532 |
| 2008/0147473 A1* | 6/2008 | Zhong | ................ | G01C 21/3484 |
| | | | | 701/25 |
| 2008/0275643 A1* | 11/2008 | Yaqub | .................. | G01C 21/343 |
| | | | | 340/995.19 |
| 2010/0088021 A1* | 4/2010 | Viner | .................... | G06Q 30/02 |
| | | | | 701/533 |
| 2010/0268447 A1* | 10/2010 | Griffiths | ............. | G01C 21/3423 |
| | | | | 701/532 |
| 2011/0238457 A1* | 9/2011 | Mason | ........... | G06Q 10/063112 |
| | | | | 705/7.14 |
| 2012/0173134 A1* | 7/2012 | Gutman | ............. | G01C 21/3469 |
| | | | | 701/400 |
| 2014/0309982 A1* | 10/2014 | Ricci | .................. | G06F 3/04886 |
| | | | | 704/3 |
| 2019/0340933 A1* | 11/2019 | Villa | .................... | G08G 5/0069 |

* cited by examiner

US 11,340,084 B1

ROUTING WITH BENEFIT ACCUMULATION

CROSS-REFERENCE TO RELATED APPLICATIONS

This application claims the benefit of U.S. Provisional Application No. 62/727,600, filed on Sep. 6, 2018, the content of which is hereby incorporated by reference in its entirety for all purposes.

TECHNICAL FIELD

The application relates generally to the field of routing using digital maps.

BACKGROUND

Digital maps can store map information that describes geographical and topographical features. As examples, descriptions of features such as transportation networks, political boundaries, and building locations can be included in the map information. Digital maps can also be annotated with other information, such as traffic conditions, locations of businesses and other attractions, restaurant reviews, business hours, or hotel availability.

Digital maps can be used for determining a travel route. Known techniques calculate a route between two points that minimizes a value such as travel time or travel distance. Known techniques also address the so-called travelling salesman problem by defining a route that visits all locations from a list of locations.

SUMMARY

One aspect of the disclosure is a method that includes defining a starting location and an ending location, defining a routing graph that has graph elements, assigning a cost for traversal to each of the graph elements, assigning a benefit for traversal to each of the graph elements, defining a cost budget, and performing multiple steps of a route planning procedure based on the starting location and the ending location. At each of multiple steps, the route planning procedure includes maintaining information that identifies candidate routes by which visited elements from the graph elements can be reached or occupied during a current step, updating an accumulated cost for each of the candidate routes based on the cost for traversal of each of the graph elements, updating an accumulated benefit for each of the candidate routes based on the benefit for traversal of each of the graph elements, determining, for each of the candidate routes, a minimum return cost for routing to the ending location, and eliminating respective ones of the candidate routes for which a sum of the accumulated cost and the minimum return cost exceeds the cost budget. The method also includes selecting, as a selected route, one of the candidate routes having a highest accumulated benefit value for traveling from the starting location to the ending location without exceeding the cost budget.

In some implementations of the method, the steps are time steps, and the cost budget is a maximum number of time steps. The method may also include defining a starting time and an ending time, wherein the maximum number of time steps is based on the starting time and the ending time.

In some implementations of the method, the cost for traversal of each of the graph elements is defined by a cost function. The cost function is based on a time required for traversing a respective one of the graph elements.

In some implementations of the method, the benefit for traversal of each of the graph elements is defined by a benefit function. In some implementations, the benefit function models a value associated with data obtained while traversing the respective one of the graph elements. In some implementations, the benefit function models a value associated with an activity engaged in while traversing the respective one of the graph elements.

In some implementations of the method, updating the accumulated benefit for a respective one of the candidate routes includes applying a modifier to the benefit for traversal based on previous visits to respective ones of the graph elements by the respective one of the candidate routes.

In some implementations of the method, updating the accumulated benefit for each of the candidate routes includes applying a modifier to the benefit for traversal based on a time of day at which the respective ones of the graph elements are reached by the candidate routes.

Another aspect of the disclosure is a non-transitory computer-readable storage device including program instructions executable by one or more processors that, when executed, cause the one or more processors to perform operations. The operations that are performed by the one or more processors include defining a starting location and an ending location, defining a routing graph that has graph elements, assigning a cost for traversal to each of the graph elements, assigning a benefit for traversal to each of the graph elements, defining a cost budget, and performing multiple steps of a route planning procedure based on the starting location and the ending location. The route planning procedure includes, at each of multiple steps, maintaining information that identifies candidate routes by which visited elements from the graph elements can be reached or occupied during a current step, updating an accumulated cost for each of the candidate routes based on the cost for traversal of each of the graph elements, updating an accumulated benefit for each of the candidate routes based on the benefit for traversal of each of the graph elements, determining, for each of the candidate routes, a minimum return cost for routing to the ending location, and eliminating respective ones of the candidate routes for which a sum of the accumulated cost and the minimum return cost exceeds the cost budget. The operations that are performed by the one or more processors also include selecting, as a selected route, one of the candidate routes having a highest accumulated benefit value for traveling from the starting location to the ending location without exceeding the cost budget.

Another aspect of the disclosure is a system that include a memory and a processor that is configured to execute instructions stored in the memory to define a starting location and an ending location, define a routing graph that has graph elements, assign a cost for traversal to each of the graph elements, assign a benefit for traversal to each of the graph elements, define a cost budget, and perform multiple steps of a route planning procedure based on the starting location and the ending location. At each of multiple steps of the route planning procedure, the processor is configured to execute instructions stored in the memory to maintain information that identifies candidate routes by which visited elements from the graph elements can be reached or occupied during a current step, update an accumulated cost for each of the candidate routes based on the cost for traversal of each of the graph elements, update an accumulated benefit for each of the candidate routes based on the benefit for traversal of each of the graph elements, determine, for each of the candidate routes, a minimum return cost for routing to the ending location, and eliminate respective ones of the candidate routes for which a sum of the accumulated cost and the minimum return cost exceeds the cost budget. The processor is further configured to execute instructions stored in the memory to select, as a selected route, one of the candidate routes having a highest accumulated benefit value for traveling from the starting location to the ending location without exceeding the cost budget.

DETAILED DESCRIPTION

The disclosure herein is directed to a route planning system that makes the most productive use of a limited resource. Benefit values and cost values are associated with traversing each of the elements of a network, such as a transportation network. As an example, the network may be represented by a graph structure that includes edges and nodes, and in which the edges represent travel between nodes and the nodes represent locations, activities, and/or decision points (e.g., which edge to traverse next).

The costs are associated with a finite resource, such as time, and a cost budget is used to describe the amount of the resource that is available. A single cost or multiple costs may be used. The route planning system maximizes the benefit value that can be obtained by traversing the network while remaining within the cost budget. The benefit values associated with traversing elements of the network can be assigned in any suitable manner and will be dependent on the usage scenario. After an element of the network has been visited, the benefit value associated with traversing it is modified to reflect the fact that it has been visited. The benefit value associated with traversing an element of the network may also be dependent on other variable factors, such as time of day or traversal of other elements of the network.

As one example, the route planning system may be applied to determine a route for a data collection agent that is visiting locations of a transportation network to collect information about the transportation network. Information about the transportation network could include lane configuration information (e.g., how many lanes and restrictions placed on their use), presence and content of traffic signs, a video recording or photographs, traffic information, and other features or circumstances that can be observed. As another example, the route planning system may be applied to determine multiple routes for multiple data collection agents that are visiting locations of a transportation network to collect information about the transportation network. As another example, the route planning system may be applied to touring an area (e.g., a city), by determining locations at which to spend time (e.g., museums and restaurants), an order for visiting the locations, and a route to follow while travelling between the locations.

Figure 1:
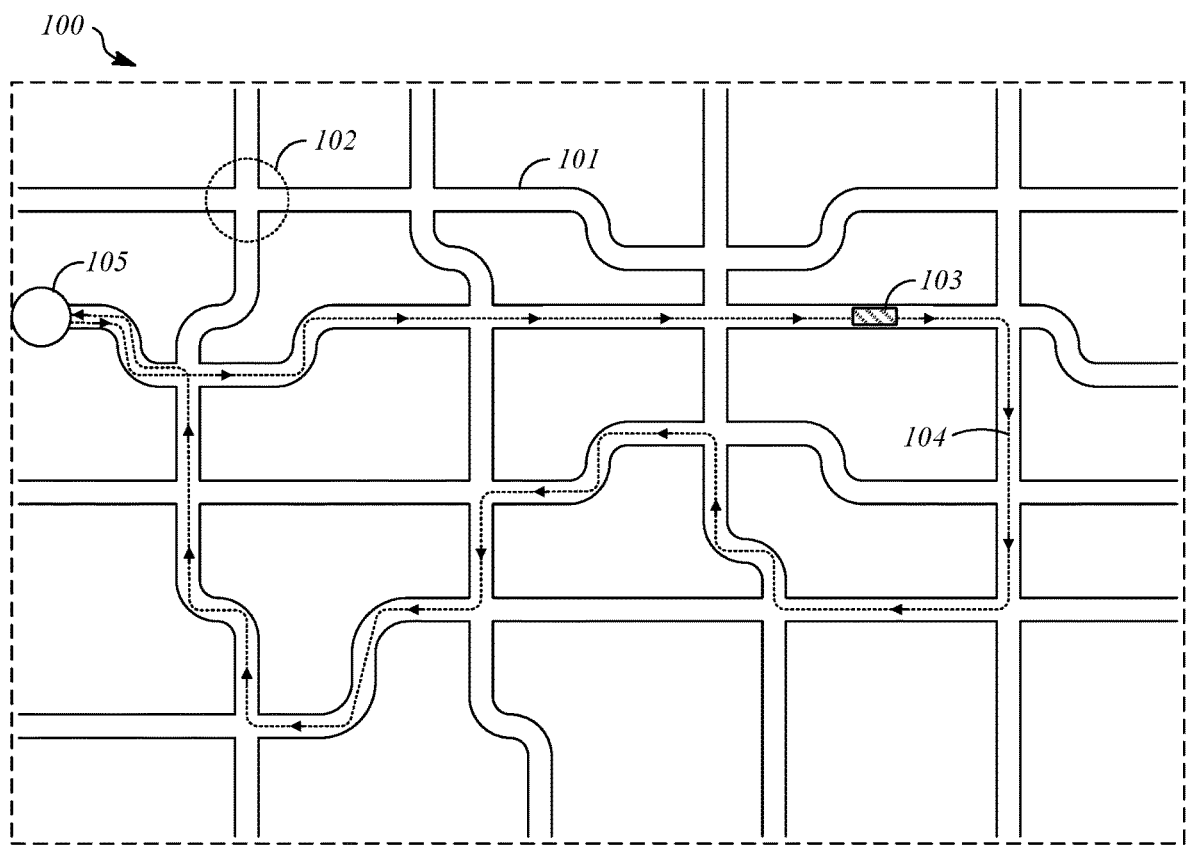
FIG. 1 is an illustration that shows a transportation network that includes road segments and intersections.

FIG. 1 is an illustration that shows a transportation network 100 that includes road segments 101 and intersections 102. An agent 103 traverses the transportation network 100 according to a route 104. The route 104 extends from a starting location to an ending location. In this example, the route 104 starts and ends at a single location 105.

The transportation network 100 is an example of a network of interconnected infrastructure elements and/or locations that correspond to physical infrastructure and locations in the real world that can be traversed (i.e., traveled along, traveled through, traveled past, etc.) and/or visited. The road segments 101 represent real-world transportation infrastructure by which travel can occur between locations. Other types of transportation infrastructure could be represented in the transportation network 100 in addition to or in place of the road segments 101 to allow travel between places, such as walking paths, biking paths, and mass transit routes. The intersections 102 represent locations where other elements meet, such as two or more of the road segments 101. In addition to or in place of the intersections, the transportation network 100 could include destinations such as homes, workplaces, stores, restaurants, museums, and parks.

The agent 103 is an entity that traverses the transportation network 100 using the route 104. As examples, the agent 103 may be a human-driven vehicle, an autonomous vehicle, a pedestrian, or a person riding a bicycle. The route 104 describes locations to be visited by the agent 103, such as a list of the road segments 101 and/or the intersections 102. The route 104 may be expressed as information in any suitable form that allows it to be understood by a human and/or interpreted by a computing system.

In the illustrated example, the agent 103 is a data collector, such as a vehicle or a person equipped with sensors. The agent 103 is configured to depart from the single location 105, traverse the transportation network 100 according to the route 104, and obtain information regarding the transportation network while doing so before returning to the single location 105. As examples, the agent 103 may obtain two-dimensional images and/or three-dimensional data (e.g., point clouds) that describe aspects of the transportation network 100. While traversing the route 104, the agent 103 makes use of a scarce resource, such as time. As will be explained herein, the route 104 is determined in a manner that is intended to maximize the benefit derived from the data collection effort that is performed by the agent 103. In addition, the agent 103 may be one of multiple agents that each traverse a separate route, where all of the routes are determined in a coordinated fashion to maximize the benefit derived from the combined data collection efforts of the agents.

The example described with respect to FIG. 1 is intended to provide context for the following description. The systems and methods that are described herein can be applied to other types of networks, using other types of agents, and for other purposes (e.g., other types of benefits). The starting and ending points of the routes generated by the systems and methods described herein may or may not be at the same location.

Figure 2:
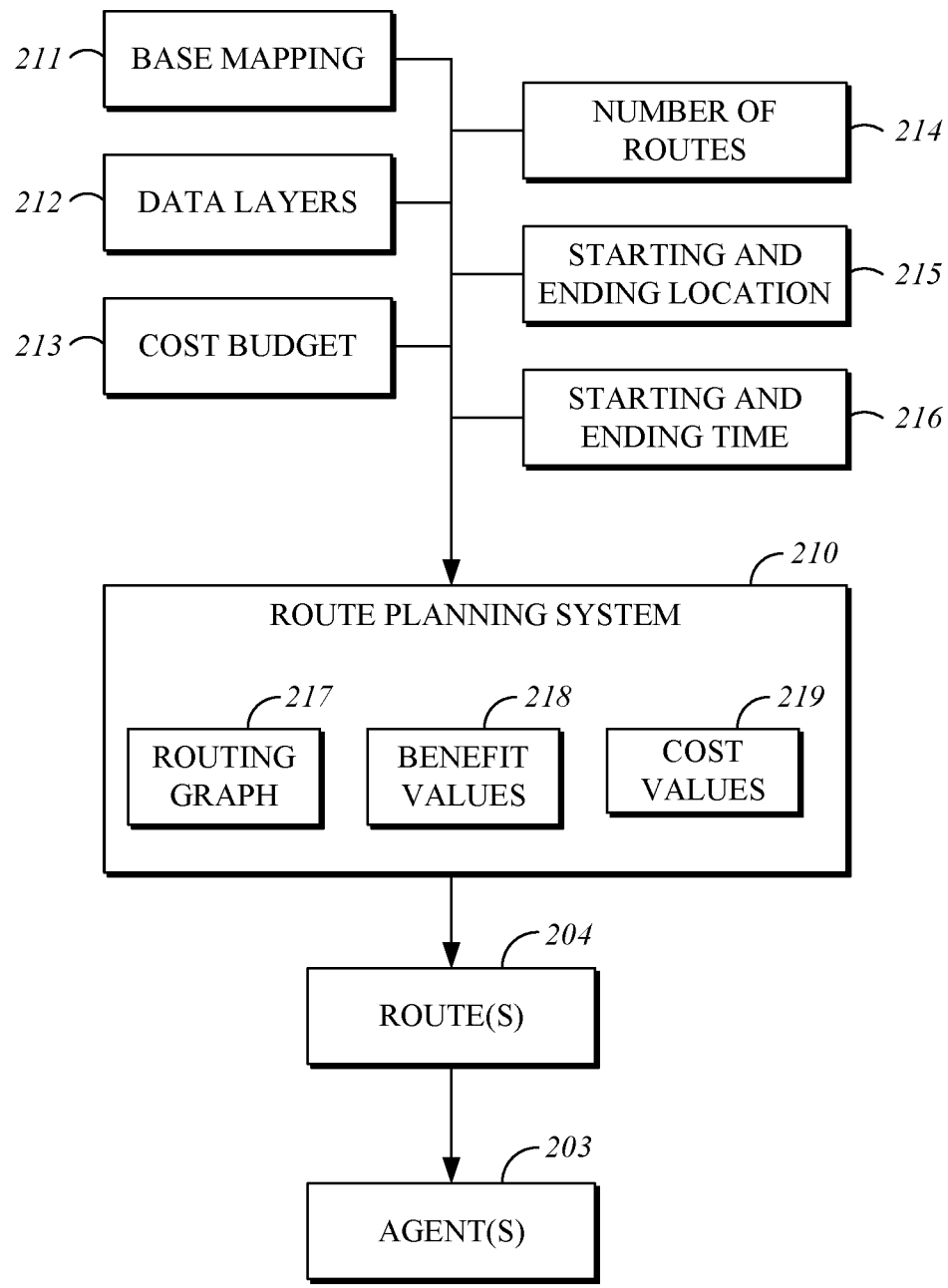
FIG. 2 is a block diagram that shows a route planning system.

FIG. 2 is a block diagram that shows an example of a route planning system 210. The route planning system 210 receives and uses inputs that include base mapping 211, data layers 212, a cost budget 213, a number of routes 214 that specifies how many routes are to be generated by the route planning system 210, a starting and ending location 215 (which may be the same) and a starting and ending time 216.

The route planning system 210 determines a routing graph 217, benefit values 218, and cost values 219. The routing graph 217, the benefit values 218, and the cost values 219 may be determined prior to routing (e.g., precomputed) or may be determined during routing. As an output, the route planning system 210 generates one or more routes 204 that can be used by one or more agents 203. The agents 203 and the routes 204 are implemented according to the description of the agent 103 and the routes 104 except as otherwise described herein.

The base mapping 211 contains map information that describes a network, such as the transportation network 100 of FIG. 1. As an example, the base mapping 211 may define segments (e.g., road segments) in a form such as a two-dimensional or three-dimensional geometry, such as lines, curves, polylines, etc.

The data layers 212 describe features relative to the base mapping 211. As one example, the data layers 212 may describe data that is associated with roadway segments or other transportation network segments such as segment lengths, speed limits, average speeds, current traffic information, and historical traffic information. As another example, the data layers 212 may describe locations such as homes, workplaces, stores, attractions, restaurants, museums, parks, coffee shops, and hotels. Other types of data that is relevant to transportation infrastructure and locations that can be accessed using transportation infrastructure can be incorporated in the data layers 212.

The cost budget 213 is a value that may be specified by a user when requesting route generation and constrains the route planning system 210 by identifying a scarce resource (or multiple scarce resources) that is consumed during traversal of the route 204 by the agent 203. Thus, the route that is generated by the route planning system 210 must satisfy the constraint represented by the cost budget, by limiting valid candidate routes to those that can be traversed by the agent 203 without exceeding the cost budget 213.

The cost budget 213 may be based on a single resource, in which case route generation is performed such that traversal of the route 204 by the agent 203 can be completed before the single resource is fully depleted. The cost budget 213 may be based on multiple resources, in which case route generation is performed such that traversal of the route 204 by the agent 203 can be completed before any of the resources are fully depleted.

As one example, the cost budget 213 may be a length of time available for traversal of the routes 204. In addition, length of time available for traversal of the routes 204 may be specified in terms of a starting time and an ending time for traversal of the routes 204, which acts as a further constraint on route generation and may affect aspects of route generation, such as the benefit values 218 and the cost values 219. In some implementations, routing is performed over a series of time steps, the cost budget 213 is a maximum number of time steps, and the maximum number of time steps is based on the starting time and ending time 216. As another example, the cost budget 213 could be based on an amount of fuel or battery power available in implementations in which the agent 203 is a vehicle.

As another example, the cost budget 213 could be based on an amount of money available in implementations in which the route planning system 210 is used to generate a route that involves spending money on activities, such as planning an itinerary for a vacation. As another example, the cost budget 213 could be based on an amount of energy persons are able to spend engaging in physical activities when planning an itinerary that involves physical activities, such as a hiking trip or a biking trip.

During route generation, the route planning system 210 defines a routing graph 217. A candidate route can be evaluated based on a total benefit for the candidate route and a total cost for the candidate route. Benefit values 218 are defined that quantify a benefit associated with traversing particular portions of the routing graph 217. The benefit values 218 for each of the graph elements from the routing graph 217 can be defined by a benefit function. As one example, in a data collection scenario, the benefit function may model a value associated with data obtained while traversing the respective one of the graph elements of the routing graph 217. As another example, in an activity planning scenario, the benefit function models a value associated with an activity engaged in while traversing the respective one of the graph elements of the routing graph 217. Cost values 219 are defined that quantify a cost associated with traversing particular portions of the routing graph 217. The cost values 219 for each of the graph elements from the routing graph 217 can be defined by a cost function. As an example, the cost function may be based on a time required for traversing a respective one of the graph elements of the routing graph 217.

The total benefit for the candidate route is determined by accumulating the benefit values 218 for the portions of the routing graph 217 that are traversed by the candidate route. The total cost for the candidate route is determined by accumulating the cost values 219 for the portions of the routing graph 217 that are traversed by the candidate route. If the total cost exceeds the cost budget 213, the candidate route is eliminated from consideration and may be marked as invalid so that it is not considered further.

Among valid candidate routes, the candidate route having the highest total benefit may be selected and output as the route 204. If multiple routes are being generated by the route planning system 210, the benefit values 218 for portions of the routing graph 217 that are traversed by the selected route are modified prior to generating the next route. Typically, the benefits values 218 will be modified by reducing them. As one example, the benefit values 218 for portions of the routing graph 217 that are traversed can be assigned a value of zero prior to generating the next route. As another example, the benefit values 218 for portions of the routing graph 217 that are traversed by the selected route can be reduced by a percentage prior to generating the next route.

Figure 3:
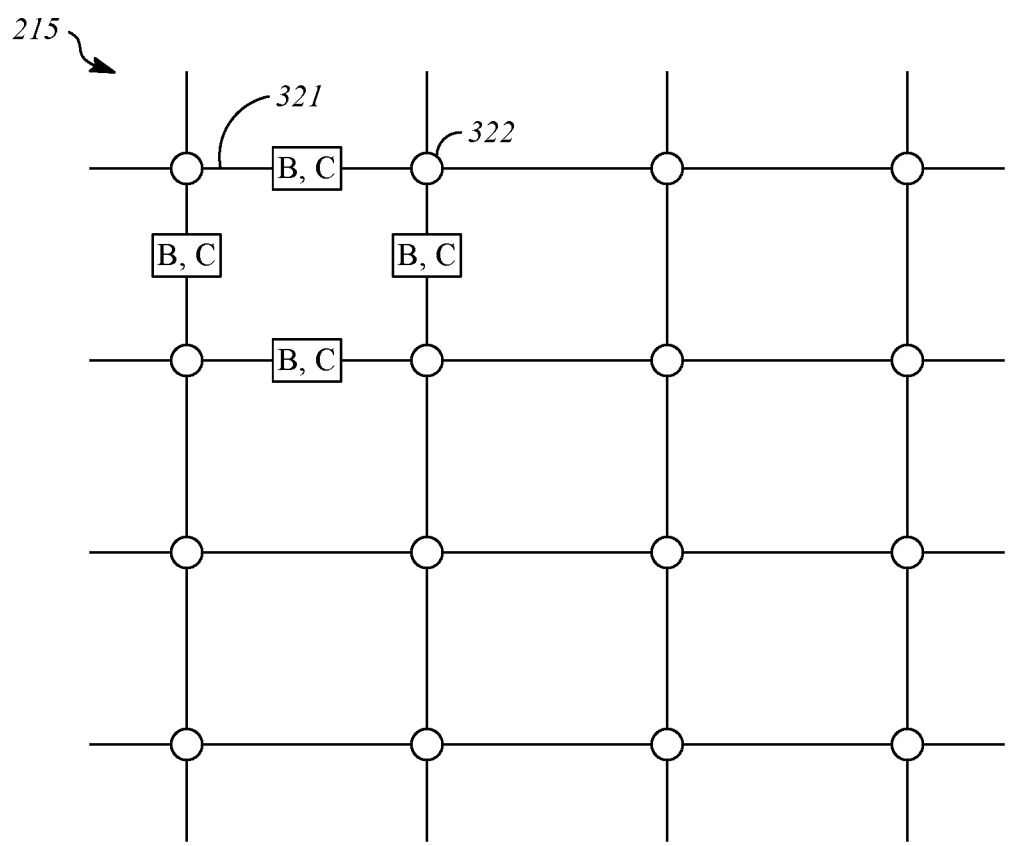
FIG. 3 is an illustration that shows an example of a routing graph that is generated by the route planning system.

FIG. 3 is an illustration that shows an example of the routing graph 217 that is generated by the route planning system 210. The routing graph 217 can be defined according to known graph theory principles to represent the base mapping 211. The routing graph 217 includes edges 321 and nodes 322. As an example, the edges 321 may represent road segments from the base mapping 211 and the nodes 322 may represent intersections from the base mapping 211. Each of the edges 321 of the routing graph 217 is assigned one of the benefit values 218 (represented as B in FIG. 3) and one of the cost values 219 (represented as C in FIG. 3).

Figure 4:
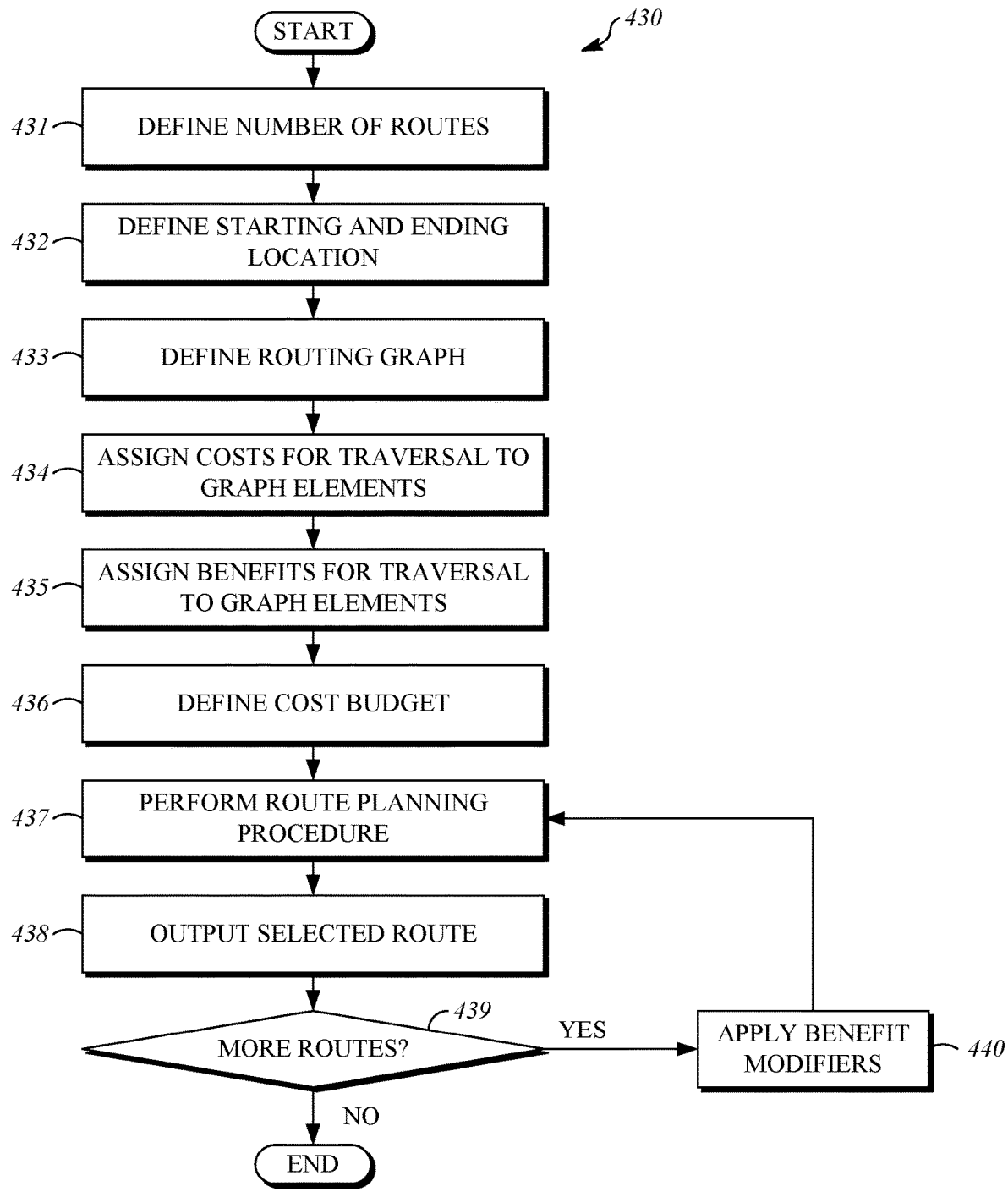
FIG. 4 is a flowchart that shows a routing process that is performed by the route planning system.

FIG. 4 is a flowchart that shows a routing process 430 that is performed by the route planning system 210. The routing process 430 can be performed using a computing device that is provided with computer program instructions. The computer program instructions can be stored in a storage device or a memory device and executed by a processor to facilitate performance of the process routing process 430 as described herein. The operations of the routing process 430 may be performed by the route planning system 210 or other system.

In operation 431, the number of routes 214 to be generated is defined. The number of routes 214 can be defined by receiving an input from a user that specifies the number of routes 214, by accessing the number of routes 214 from a stored plan (e.g., a previously-prepared data file), randomly, or by any other method.

In operation 432, a starting location and ending location 215 are defined. The starting location and ending location 215 can be defined by receiving an input from a user that specifies locations, by accessing the locations from a stored plan (e.g., a previously-prepared data file), randomly, or by any other method.

In operation 433, the routing graph 217 is defined. As an example, the routing graph 217 can be defined as a representation of the base map 211. The routing graph 217 includes graph elements, which are portions of the routing graph 217 that represent locations and connections between locations, such as in the form of the edges 321 and the nodes 322 as previously described.

In operation 434, a cost for traversal is assigned to each of the graph elements from the routing graph 217. As one example, the cost for traversal may represent the time required to travel along the real-world structure (e.g., a portion of a road) that is represented by the respective graph element from the routing graph. As another example, the cost may be an amount of money that is required to engage in an activity that is represented by a graph element from the routing graph 217, which is applicable to implementations of the routing process 430 in which edges or nodes of the routing graph represent activities that consume monetary resources, such as air travel or visiting a museum. As another example, the costs for traversal can represent energy available to participate in strenuous activities such as walking, hiking, climbing, swimming, or bicycle riding. In some implementations, operation 436 may include defining multiple costs for traversal of each of the graph elements, each representing a different type of cost, and which can be used concurrently during routing to develop a route that makes the most efficient use of an asset when constrained by multiple types of scarce resources.

In operation 435, a benefit for traversal is assigned to each of the graph elements from the routing graph 217. The benefits for traversal represent the value of visiting a real-world location that is represented by one of the elements of the routing graph 217. Benefits may be values that are used compare options to one another to understand how resources can be best used, and therefore can be relative values, for example, indicating that visiting a first portion of the routing graph 217 has a higher value associated with it that visiting a second portion of the routing graph 217. In one data collection scenario, where visiting an element of the routing graph 217 is associated with collecting information (e.g., photographs, video, three-dimensional point clouds) at the corresponding real-world location, the benefit may be calculated as a function of the time elapsed since information was last collected at the location and the popularity of the location (e.g., daily vehicle volume on a roadway or volume of requests for mapping information for the location). In another data collection scenario, where certain types of observations are desirable (e.g., observations of specific objects such as bicycles or motorcycles), side data can be used to assign benefits according to the likelihood of making the desired observation at a location associated with a particular element of the routing graph 217. In an activity planning scenario, side data describing activities (e.g., third-party reviews) can be used in combination with user preferences (e.g., describing the types of activities that the user prefers) to determine benefits for traversing graph elements from the routing graph 217. As an example, nodes of the routing graph 217 could represent visiting a museum or visiting a zoo, and the values associated with each of these activities could be assigned based on information describing user preferences and/or third-party information describing the quality of the experience.

In operation 436, the cost budget 213 is defined. The cost budget 213 represents the available amount of a scarce resource that is consumed while following a route, such as time, energy, or money. In some implementations, operation 436 may include defining multiple cost budgets that each represent a different type of cost, and which can be used concurrently during routing to develop a route that makes the most efficient use of an asset when constrained by multiple types of scarce resources.

In operation 437 a route planning procedure is performed. The route planning procedure is a multiple-step process that determines how to make the best use of a scarce resource (e.g., time), which is modelled by maximizing the benefit that is accumulated without exceeding the cost budget. The route planning procedure 437 attempts to identify a route that achieves the highest benefit without exceeding the constraint defined by the scarce resource. The result of the route planning procedure is a selected route that can be followed for navigation and/or activity planning.

The route planning procedure 437 is performed in multiple steps. As an example, the route planning procedure 437 may be performed according to time steps (e.g., from an initial time step $t\_0$ to a final time step $t\_f$). The time steps may be determined according to the starting time and ending time 216.

At each step, the route planning procedure 437 evaluates each graph element (e.g., edge) from the routing graph 217 that can be reached or occupied at the current step and evaluates the best way to arrive at the next time step. At each step, the route planning procedure 437 also evaluates how the remaining portion of the cost budget 213 can be utilized (e.g., how to spend the remaining time until the ending time), as well as evaluating routes for reaching the ending location.

The route planning procedure 437 can be thought of as defining and analyzing a large number of candidate routes concurrently, with each of the candidate routes representing a way that time can be spent. Thus, as a candidate route reaches a decision point, it can split into two candidate routes. During the route planning procedure, candidate routes can be analyzed, and selectively eliminated. As an example, a candidate route can be eliminated from consideration if there is no way to reach the ending location without exceeding the cost budget 213.

The route planning procedure 437 can be configured to tune benefits associated with exploration (visiting new locations) and exploitation (visiting high value locations). As an example, for a particular candidate route, the benefit associated with visiting a location (e.g., a location associated with a graph element of the routing graph 217) can be reduced after it has been visited, such as by 25% or entirely (i.e., zero benefit), such that the benefit is lower in subsequent visits.

The route planning procedure 437 can also modify benefits according to variable factors. As one example, benefits can be adjusted by time of data, for example, to avoid sun glare in images. As another example, benefits can be adjusted to disincentivize certain actions, such as by reducing the amount of the benefit associated with traveling along a road if it is reached by making a left turn. In activity planning examples, benefits can be modified for various reasons, such as to encourage variety (e.g., avoid visiting two museums in a row) or to prevent exhaustion (e.g., avoid long periods of time without a break).

In operation 438 the selected route that was determined in operation 437 by the route planning procedure is output. The selected route can be provided for use, such as by the agent 103, and/or can be stored for later use.

In operation 439, a determination is made as to whether more routes remain to be generated. This determination can be made based on a comparison of the total number of routes generated by the routing process 430 as compared to the number of routes 214 to be generated, as defined in operation 431. If more routes remain to be generated, the process proceeds to operation 440. Otherwise, the process ends.

At operation 440, the benefits that are associated with traversing elements of the routing graph 217 can be modified by applying benefit modifiers. The benefit modifiers reduce the amount of benefit obtained by traversing a portion of the routing graph 217 that was traversed by the selected route that was generated in the prior iteration of the route planning procedure of operation 437 and output in operation 438. The benefit modifiers are intended to cause subsequent iterations of the route planning procedure of operation 439 to generate different routes, since the total benefit accumulated by following a route that was previously selected will be reduced. As an example, the benefit associated with all elements from the routing graph 217 that were traversed by a previously-selected route can be reduced by a percentage, such as 25%. Other modifiers or methods of reducing the benefits associated with traversing portions of the routing graph 217 that are included in previously-selected routes can be used.

Figure 5:
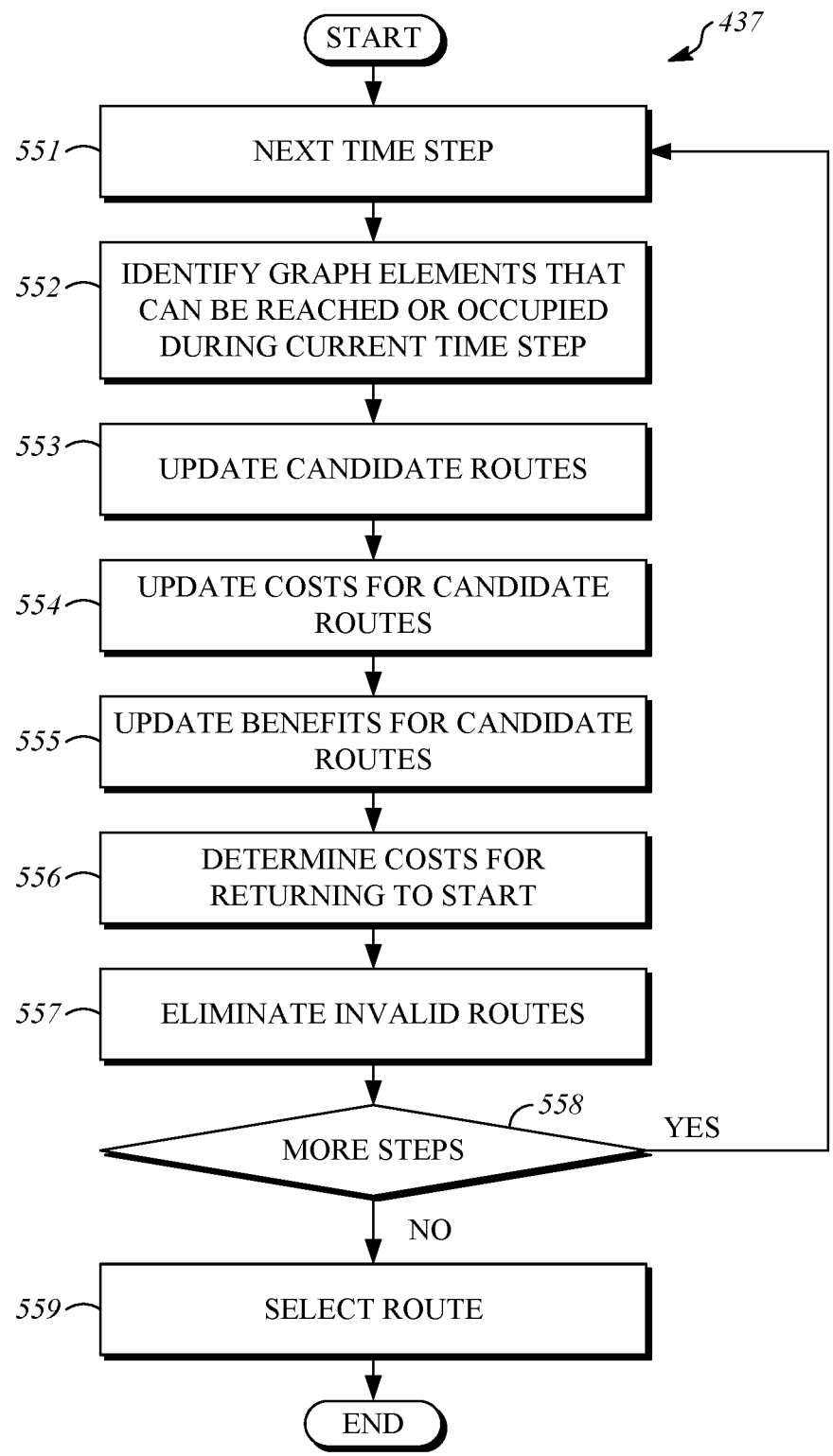
FIG. 5 is a flowchart that shows an example of a route planning procedure that is performed by the route planning system.

FIG. 5 is a flowchart that shows an example of the route planning procedure 437 that is performed by the route planning system 210. The route planning procedure 437 can be performed using a computing device that is provided with computer program instructions. The computer program instructions can be stored in a storage device or a memory device and executed by a processor to facilitate performance of the route planning procedure 437 as described herein. The operations of the route planning procedure 437 may be performed by the route planning system 210 or other system.

In the example described below, the steps of the route planning procedure 437 are time steps, and the cost budget 213 is a time budget that is based on the starting and ending time 216, such that the cost budget 213 is met by reaching the ending location by the final time step. As described above, costs and steps can be implemented in other ways. In addition, the starting location and the ending location are the same location in the example described below, but the route planning procedure 437 can be implemented using different locations for the starting location and the ending location.

In operation 551, a current time step (t_c) is updated to the next time step value. As an example, time steps may vary from an initial time step t_0 to a final time step t_f, and the number of time steps may be based on the starting and ending time 216. Time steps may represent a fixed increment of time, such as ten seconds. In a first iteration of operation 551, the current time step is set to the initial time step t_0.

The route planning procedure 437 maintains information that identifies candidate routes by which elements from the graph elements from the routing graph 217 can be reached or occupied during a current step. This information is created and/or updated in operation 552, in which graph elements are identified that can be reached or occupied during the current time step. Initially, only graph elements (i.e., edges and nodes) that are adjacent to the starting location will be reachable during the current time step, and the number of candidate routes will be small. As more graph elements become reachable, the number of candidate routes will increase in correspondence to the number of reachable graph elements. Whether a graph element is reachable in a current time step can be determined according to known routing techniques, by determining whether a route can be defined from the starting location to a particular location of the routing graph 217 within the time period from the initial time step to the current time step.

In operating 553, the candidate routes are updated. As an example, for each candidate route, a determination can be made as to whether a new graph element from the routing graph 217 can be visited during the current time step. If so, the candidate route is updated to include navigation to the respective graph element. If multiple new graph elements from the routing graph 217 can be visited during the current time step (e.g., a decision between turning left and turning right), candidate routes can be defined for each of the accessible graph elements from the routing graph 217. In some implementations, operation 553 may be performed using a routing algorithm similar to the Bellman-Ford algorithm or another suitable algorithm, to determine the highest value route by which each of the reachable graph elements can be reached at each time step.

In operation 554, the accumulated costs for the candidate routes are updated. For example, accumulated costs can be updated by adding the cost values 219 for all of the portions of the routing graph 217 that are included in each candidate route. In operation 555, the accumulated benefits for the candidate routes are updated. For example, accumulated benefits can be updated by adding the benefit values 218 for all of the portions of the routing graph 217 that are included in each candidate route.

Modifiers can be applied to the benefit values 218 when updating the accumulated benefits for the candidate routes in operation 555. In some implementations, updating the accumulated benefit for a respective one of the candidate routes includes applying a modifier to the benefit for traversal based on previous visits to respective ones of the graph elements of the routing graph 217 by the respective one of the candidate routes. In some implementations, updating the accumulated benefit for each of the candidate routes includes applying a modifier to the benefit for traversal based on a time of day at which the respective ones of the graph elements of the routing graph 217 are reached by the candidate routes. As another example, the benefits can be updated based on actions taken while following the candidate route, such as taking a left turn. As another example, for routing scenarios that include activities, the benefits can be updated based on other activities performed while following the candidate route, such as by reducing the benefit for including a second museum visit in the candidate route.

In operation 556, for each of the candidate routes, the costs for returning to the starting location are determined. Costs for returning to the starting location (or for routing to a different ending location) can be determined using well-known routing algorithms. Thus, operation 556 may include determining, for each of the candidate routes, a minimum return cost for routing to back to the starting location (or other ending location).

In operation 557, invalid routes are eliminated from further consideration. As an example, operation 557 may include eliminating respective ones of the candidate routes for which a sum of the accumulated cost and the minimum return cost exceeds the cost budget 213. Other criteria may be used for eliminating candidate routes. As an example, at each time step candidate routes could be eliminated for having an accumulated benefit value that is lower than the highest-benefit route by a certain margin, such as a percentage that is static or dynamic (e.g., based on standard deviation).

In operation 558, a determination is made as to whether more time steps remain. If more time steps remain (i.e., t_c<t_f) the process returns to operation 551. If no more time steps remain (i.e., t_c=t_f), the process proceeds to operation 559.

Operation 559 includes selecting, as a selected route, one of the candidate routes having a highest accumulated benefit value for traveling from the starting location to back to the starting location (or to a different the ending location) without exceeding the cost budget 213.

Figure 6:
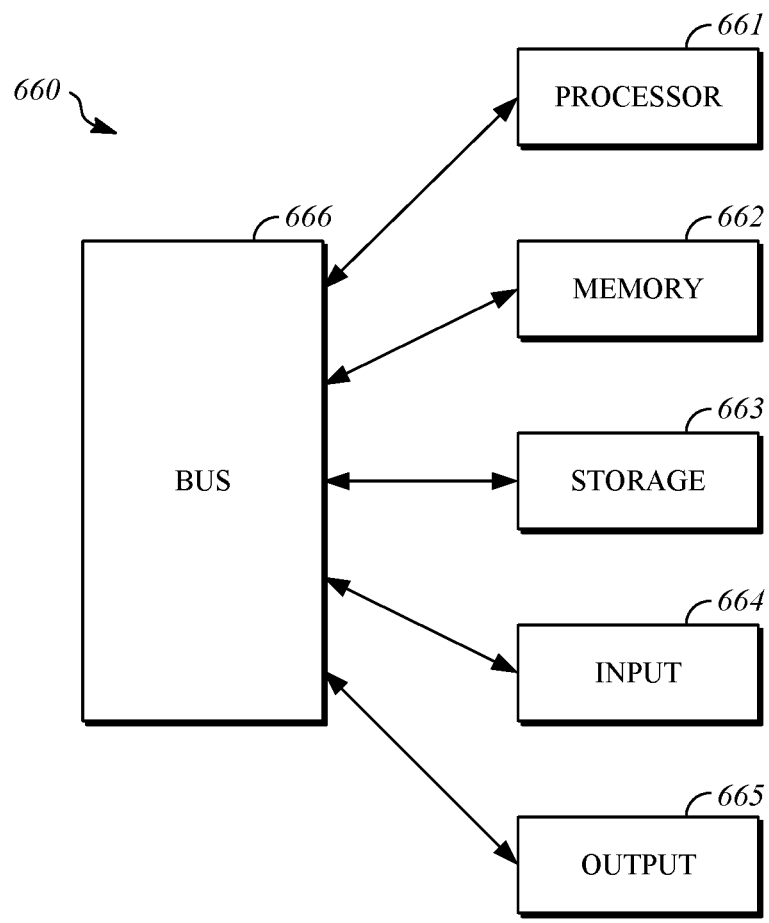
FIG. 6 is an illustration that shows an example of a configuration for a computing device that can be utilized to implement the route planning system.

FIG. 6 is an illustration that shows an example of a configuration for a computing device 660 that can be utilized to implement the route planning system 210. The computing device 660 can include a processor 661, a memory 662, a storage device 663, one or more input devices 664, and one or more output devices 665. The computing device 660 can include a bus 666 or a similar device to interconnect the components for communication. The processor 661 is operable to execute computer program instructions and perform operations described by the computer program instructions. As an example, the processor 661 can be a conventional device such as a central processing unit. The memory 662 can be a volatile, high-speed, short-term information storage device such as a random-access memory module. The storage device 663 can be a non-volatile information storage device such as a hard drive or a solid-state drive. The input devices 664 can include any type of human-machine interface such as buttons, switches, a keyboard, a mouse, a touchscreen input device, a gestural input device, or an audio input device. The output devices 665 can include any type of device operable to provide information to a user, such as a display screen.

The route planning systems disclosed herein may obtain data to personalize the routes and recommendations made by the route planning systems. While much of this data will be publicly available information, some of the data may include personal information that is obtained from the users and is not publicly available. This data may include, as examples, contact information, social media account information, demographic information, personal preferences, and health information.

Using personal information and other data can enhance the value of these systems to users. For example, personal information data can be used to suggest activities that are of interest to the user. Accordingly, users are able to tailor the recommendation and provider by the route planning system by providing the personal information. Other uses for personal information data that benefit the user are also contemplated by the present disclosure. For instance, health and fitness data may be used to provide avoid planning an overly strenuous route for a user.

Entities that collect, analyze, disclose, transfer, store, or otherwise use personal information are expected to comply with of exceed industry standard privacy policies and privacy practices. In particular, such entities should implement and consistently use privacy policies and practices that are generally recognized as meeting or exceeding industry or governmental requirements for maintaining personal information data private and secure. Users should be informed of these policies and practices in a transparent manner.

Personal information should only be collected from users with consent and after informing the user as to the reasons why the data is being collected and as to the manner in which the personal information will be used. Personal information should be secured and safeguarded by the entities that collect and use the personal information, and third-party evaluations should be performed to ensure compliance with widely accepted privacy policies and practices. In addition, policies and procedures should be adopted in consideration of the particular types of personal information being obtained and in consideration of applicable laws and standards, including jurisdiction-specific considerations.

The systems described herein may be implemented such that users can choose whether to share personal information, and such that users can choose what types of personal information to share. For example, implementations of the systems described herein may use hardware and/or software elements to prevent or block access to personal information. As an example, users may "opt in" or "opt out" of participation in the collection of personal information. As another example, users can select not to provide their current location to the route planning system. As another example, users can select to limit the length of time that route-planning-associated data is maintained or entirely prohibit the development of a route-planning profile. Notifications can also be provided relating to the access or use of personal information. As an example, when a user downloads an app that implements route planning functions, the user may be notified about collection of personal information, and the user may be notified later when the personal information will be accessed and used by the app.

It is intended that the systems and methods described herein will be implemented in a manner that minimizes the risk of unintentional or unauthorized access or use of personal information. Risk can be minimized by limiting the collection of personal information and deleting personal information when it is no longer needed. When applicable, personal data can be anonymized and/or stored only in aggregate.

The systems and methods that are described herein can also be implemented in a manner that eliminates or minimizes the need for obtaining and using personal information. For example, routes can be planned for users based on non-personal information or a bare minimum amount of personal information. Some implementations of the inventions can utilize only non-personal information that is available to the route planning system and/or publicly available information.

What is claimed is:

1. A method, comprising:
    defining a starting location and an ending location;
    defining a routing graph that has graph elements, wherein the routing graph represents a transportation network, and the graph elements represent locations from the transportation network and connections between the locations from the transportation network;
    assigning a cost value for traversal to each of the graph elements, wherein the cost value for traversal of each of the graph elements is based on a resource usage associated with traversal of each of the graph elements;
    assigning a benefit value for traversal to each of the graph elements, wherein the benefit value for traversal of each of the graph elements is based on desirability of visiting a real-world location that is represented by a respective one of the graph elements to perform a data collection activity while visiting the real-world location that corresponds to the respective one of the graph elements;

defining a cost budget;
performing multiple steps of a route planning procedure based on the starting location and the ending location, the route planning procedure including, at each of multiple steps:
  identifying reachable elements from the graph elements that can be reached during a current step,
  updating candidate routes by applying a routing algorithm to the routing graph to determine a highest benefit route for each of the reachable elements,
  updating an accumulated cost for each of the candidate routes based on the cost value for traversal of each of the graph elements, and
  updating an accumulated benefit for each of the candidate routes based on the benefit value for traversal of each of the graph elements; and
selecting, as a selected route, one of the candidate routes having a highest accumulated benefit among routes from the candidate routes having respective accumulated costs that do not exceed the cost budget.

2. The method of claim 1, wherein the steps are time steps, and the cost budget is a maximum number of time steps.

3. The method of claim 2, further comprising:
defining a starting time and an ending time, wherein the maximum number of time steps is based on the starting time and the ending time.

4. The method of claim 1, wherein the cost value for traversal of each of the graph elements is defined by a cost function.

5. The method of claim 4, wherein the cost function is based on a time required for traversing the respective one of the graph elements.

6. The method of claim 1, wherein the benefit value for traversal of each of the graph elements is defined by a benefit function.

7. The method of claim 1, wherein updating the accumulated benefit for a respective one of the candidate routes includes applying a modifier to the benefit value for traversal based on previous visits to respective ones of the graph elements by the respective one of the candidate routes.

8. The method of claim 1, wherein updating the accumulated benefit for each of the candidate routes includes applying a modifier to the benefit value for traversal based on a time of day at which the respective ones of the graph elements are reached by the candidate routes.

9. A non-transitory computer-readable storage device including program instructions executable by one or more processors that, when executed, cause the one or more processors to perform operations, the operations comprising:
defining a starting location and an ending location;
defining a routing graph that has graph elements, wherein the routing graph represents a transportation network, and the graph elements represent locations from the transportation network and connections between the locations from the transportation network;
assigning a cost value for traversal to each of the graph elements, wherein the cost value for traversal of each of the graph elements is based on a resource usage associated with traversal of each of the graph elements;
assigning a benefit value for traversal to each of the graph elements, wherein the benefit value for traversal of each of the graph elements is based on desirability of visiting a real-world location that is represented by a respective one of the graph elements to perform a data collection activity while visiting the real-world location that corresponds to the respective one of the graph elements;
defining a cost budget;
performing multiple steps of a route planning procedure based on the starting location and the ending location, the route planning procedure including, at each of multiple steps:
  identifying reachable elements from the graph elements that can be reached during a current step,
  updating candidate routes by applying a routing algorithm to the routing graph to determine a highest benefit route for each of the reachable elements,
  updating an accumulated cost for each of the candidate routes based on the cost value for traversal of each of the graph elements,
  updating an accumulated benefit for each of the candidate routes based on the benefit value for traversal of each of the graph elements; and
selecting, as a selected route, one of the candidate routes having a highest accumulated benefit among routes from the candidate routes having respective accumulated costs that do not exceed the cost budget.

10. The non-transitory computer-readable storage device of claim 9, wherein the steps are time steps, and the cost budget is a maximum number of time steps, the operations further comprising:
defining a starting time and an ending time, wherein the maximum number of time steps is based on the starting time and the ending time.

11. The non-transitory computer-readable storage device of claim 9, wherein the cost value for traversal of each of the graph elements is defined by a cost function, and the cost function is based on a time required for traversing a respective one of the graph elements.

12. The non-transitory computer-readable storage device of claim 9, wherein updating the accumulated benefit for a respective one of the candidate routes includes applying a modifier to the benefit value for traversal based on previous visits to respective ones of the graph elements by the respective one of the candidate routes.

13. A system, comprising:
a memory; and
a processor configured to execute instructions stored in the memory to:
  define a starting location and an ending location;
  define a routing graph that has graph elements, wherein the routing graph represents a transportation network, and the graph elements represent locations from the transportation network and connections between the locations from the transportation network;
  assign a cost value for traversal to each of the graph elements, wherein the cost value for traversal of each of the graph elements is based on a resource usage associated with traversal of each of the graph elements;
  assign a benefit value for traversal to each of the graph elements, wherein the benefit value for traversal of each of the graph elements is based on desirability of visiting a real-world location that is represented by a respective one of the graph elements to perform a data collection activity while visiting the real-world location that corresponds to the respective one of the graph elements;
  define a cost budget;
  perform multiple steps of a route planning procedure based on the starting location and the ending location, wherein at each of multiple steps of the route planning procedure, the processor is configured to execute instructions stored in the memory to:

identify reachable elements from the graph elements that can be reached during a current step, update candidate routes by applying a routing algorithm to the routing graph to determine a highest benefit route for each of the reachable elements, update an accumulated cost for each of the candidate routes based on the cost value for traversal of each of the graph elements, update an accumulated benefit for each of the candidate routes based on the benefit value for traversal of each of the graph elements; and select, as a selected route, one of the candidate routes having a highest accumulated benefit among routes from the candidate routes having respective accumulated costs that do not exceed the cost budget.

14. The system of claim 13, wherein the steps are time steps, and the cost budget is a maximum number of time steps, and the processor is further configured to execute instructions stored in the memory to:

define a starting time and an ending time, wherein the maximum number of time steps is based on the starting time and the ending time.

15. The system of claim 13, wherein the cost value for traversal of each of the graph elements is defined by a cost function, and the cost function is based on a time required for traversing a respective one of the graph elements.

16. The method of claim 1, wherein each of the multiple steps of the route planning procedure further includes:

determining, for each of the candidate routes, a minimum return cost for routing to the ending location, wherein the ending location and the starting location are a single location, and eliminating respective ones of the candidate routes for which a sum of the accumulated cost and the minimum return cost exceeds the cost budget.

17. The non-transitory computer-readable storage device of claim 9, wherein each of the multiple steps of the route planning procedure further includes:

determining, for each of the candidate routes, a minimum return cost for routing to the ending location, wherein the ending location and the starting location are a single location, and eliminating respective ones of the candidate routes for which a sum of the accumulated cost and the minimum return cost exceeds the cost budget.

18. The system of claim 13, wherein at each of the multiple steps of the route planning procedure the processor is further configured to execute instructions stored in the memory to:

determine, for each of the candidate routes, a minimum return cost for routing to the ending location, wherein the ending location and the starting location are a single location, and eliminate respective ones of the candidate routes for which a sum of the accumulated cost and the minimum return cost exceeds the cost budget.

19. The method of claim 1, wherein the benefit value for traversal of each of the graph elements is based in part on a time elapsed since a previous data collection activity was performed at the real-world location that corresponds to the respective one of the graph elements.

20. The non-transitory computer-readable storage device of claim 9, wherein the benefit value for traversal of each of the graph elements is based in part on a time elapsed since a previous data collection activity was performed at the real-world location that corresponds to the respective one of the graph elements.

21. The system of claim 13, wherein the benefit value for traversal of each of the graph elements is based in part on a time elapsed since a previous data collection activity was performed at the real-world location that corresponds to the respective one of the graph elements.

22. The method of claim 1, further comprising:

outputting the routing graph for use by an agent during travel from the starting location to the ending location according to the selected route to perform the data collection activity.

23. The method of claim 1, further comprising:

traveling, by an agent, from the starting location to the ending location according to the selected route to perform the data collection activity.

* * * * *